United States Patent Office 2,784,204
Patented Mar. 5, 1957

2,784,204

DIPHENYLAMINE-VINYLSULFONE

Johannes Heyna, Alfred Carl, and Hans-Dieter Wagner, Frankfurt am Main, Germany, assignors to Farbwerke Hoechst Aktiengesellschaft vormals Meister Lucius & Bruning, Frankfurt am Main Hochst, Germany, a company of Germany No Drawing. Application June 4, 1953, Serial No. 359,642

Claims priority, application Germany June 9, 1952

1 Claim. (Cl. 260—397.6)

The present invention relates to new water-insoluble dyestuffs containing one or two vinylsulfone groups; more particularly it relates to water-insoluble dyestuffs derived from the series of azo-dyestuffs, nitro-dyestuffs and anthraquinone-dyestuffs containing the grouping $$(-SO_2-CH=CH_2)_n$$

wherein $n$ stands for one of the numbers 1 and 2.

We have found that new valuable dyestuffs insoluble in water are obtained by introducing into the molecule of dyestuffs, which do not contain a carboxylic acid or sulfonic acid group, one or two vinylsulfone groupings of the formula

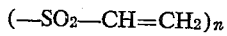

The vinylsulfone group can be introduced into the dyestuff molecule according to one of the known methods, for example, by converting a water-insoluble dyestuff or a primary product into the sulfinic acid or the sodium salt of such acid and then reacting the product with beta-chlorethyl alcohol or ethylene oxide or a homologue thereof. From the beta-hydroxy-ethyl-sulfones obtained by such reaction, the compounds containing the grouping 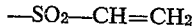 may be obtained in known manner by way of the beta-chlorethyl-sulfone compound or the beta-hydroxy-ethyl-sulfone compound esterified with sulfuric acid. Dyestuffs of the present kind may also be prepared by subjecting to oxidation a compound containing the grouping —S—CH=CH₂ or the grouping —SO—CH=CH₂. In this way a great number of dyestuffs of the most various classes can readily be obtained. They may, for instance, be derived from the series of azo-dyestuffs, nitro-dyestuffs and anthraquinone-dyestuffs.

The new water-insoluble dyestuffs containing the vinylsulfone group have a good to very good affinity for acetate rayon and polyamide fibres or the mixtures thereof. They are absorbed by the fibre in dispersed state from a weakly alkaline bath, for example, a soap bath, especially in the presence of an emulsifier, and yield full, clear tints of very good fastness properties.

In the case of azo-dyestuffs the vinylsulfone group is preferably present in the diazo-component, it may, however, also be present once or twice in the coupling component or in both components. In the series of the azo-dyestuffs, the following examples may be mentioned as showing the types coming into consideration for the present invention:

The azo-dyestuffs from diazotized:

(1) 1-aminobenzene-4-vinylsulfone and N.N-diethylaniline,
(2) 1-amino-2-chlorobenzene-4-vinylsulfone and 3-chloro-N.N-di-beta-hydroxyethyl-aniline,
(3) 1-aminobenzene-4-vinylsulfone and 1.3-diamino-4-nitro-benzene,
(4) 1-amino-2-chlorobenzene-4-vinylsulfone and 3-hydroxy-7′.8′-benzo-1.2.3.4-tetrahydroquinoline,
(5) 1-aminobenzene-4-vinylsulfone and aniline,
(6) 1-amino-2.6-dichlorobenzene-4-vinylsulfone and 3-methyl-N.N-di-beta-hydroxyethyl-aniline,
(7) 1-aminobenzene-2-vinylsulfone and N-ethyl-N-beta-hydroxyethyl-aniline,
(8) 1-amino-4-nitrobenzene-2-vinylsulfone and N-butyl-N-beta-hydroxyethyl-aniline,
(9) 2.4-dinitro-1-aminobenzene and 1-benzylaminobenzene-2-vinyl-sulfone,
(10) Aniline and 1-(2′-chloro-5′-vinylsulfonyl-phenyl)-3-methyl-5-pyrazolone,
(11) 2-amino-1-hydroxybenzene-5-vinylsulfone and 3-methyl-N.N-di-beta-hydroxyethyl-aniline,
(12) 1-aminobenzene-3-vinylsulfone and 4-hydroxy-1-N-methyl-2-quinolone.

As further examples of dyestuffs from other classes the following dyestuffs may be named:

(1) 2.4-dinitro-diphenylamine-4′-vinylsulfone,
(2) 2-nitrodiphenylamine-4-vinylsulfone,
(3) N-(2′-nitro-4′-vinylsulfonyl-phenyl)-morpholine,
(4) 1-aminoanthraquinone-2-vinylsulfone,
(5) 1.4-di-(3′.3″-vinylsulfonyl)-anilido-anthraquinone,
(6) 1-methylamino-4-(3′-vinylsulfonyl)-anilido-anthraquinone,
(7) The condensation product from 5-amino-8-hydroxy-1.4-di-imino-naphthoquinone and 1-amino-2-methoxy-benzene-5-vinyl-sulfone.

The following examples serve to illustrate the invention, but they are not intended to limit it thereto; the parts being by weight unless otherwise stated; the parts by weight and the parts by volume are related to each other as are kilograms to liters:

Example 1

12.3 parts of 1-amino-4-nitrobenzene-2-(beta-hydroxyethylsulfone) are introduced at 25° C.–30° C. into 60 parts of concentrated sulfuric acid (specific gravity 1.84).

The mixture is stirred for 3 hours at 30° C.–35° C., cooled to 5° C.–10° C. and at this temperature diazotized with 25.0 parts of a nitrosylsulfuric acid of 11.5 percent strength. The sulfuric acid solution is stirred for 3 hours at 15° C.–20° C. and then slowly added dropwise to a solution of 9.7 parts of N-butyl-N-beta-hydroxyethyl-aniline in 20 parts by volume of 5 n hydrochloric acid, while adding the necessary quantity of ice. The mixture is stirred for 7 hours while cooling with ice and for 5 hours at room temperature. The dyestuff so obtained is filtered off with suction and converted by means of a dilute sodium hydroxide solution into the vinyl-compound of the following formula

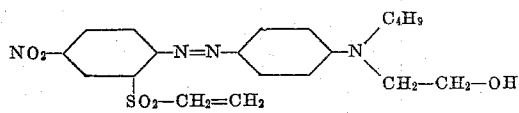

The dyestuff yields on acetate rayon a beautiful red-violet dyeing of a good fastness to washing, fulling and light. On polyamide fibre a violet dyeing of similar good fastness properties is obtained.

Example 2

14.6 parts of the diazo-sulfuric acid ester from 1-aminobenzene-2-(beta-hydroxyethylsulfone) of the probable formula

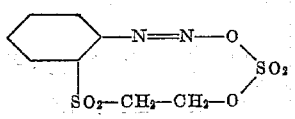

are stirred in an acid solution with 9.6 parts of N-butyl-N-beta-hydroxyethyl-aniline until the coupling is complete. The dyestuff is filtered off with suction and converted into the vinyl-compound with a dilute sodium hydroxide solution.

The dyestuff dispersed in a soap bath dyes polyamide fibre yarn full, yellowish red-orange tints of good fastness to water, washing and perspiration.

Example 3

18.3 parts of 1-aminobenzene-4-vinylsulfone are diazotized in the usual manner and coupled in an aqueous alcoholic solution with 16.9 parts of diphenylamine. There is obtained in a good yield the dyestuff of the following formula

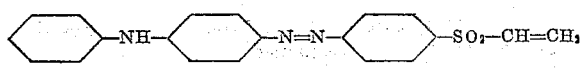

It dyes acetate rayon from a bath containing 1 gram of soap per litre at 75° C.–80° C. reddish-yellow tints of very good fastness to water, washing, sea-water and perspiration and good fastness to light. The dyeing can be discharged perfectly white. On polyamide fibre there is obtained an orange dyeing having likewise very good fastness to wet processing and good fastness to light.

Example 4

18.3 parts of 1-aminobenzene-3-vinylsulfone are diazotized in the usual manner and coupled in a weakly alkaline solution with 10.8 parts of 1-hydroxy-3-methyl-benzene while cooling with ice. The dyestuff dyes polyamide fibre yarn from a bath containing 1 gram of soap per liter clear, yellow tints of very good fastness to washing, fulling, perspiration, sea-water and decatizing. The dyeing can be discharged perfectly white. On acetate rayon a vivid yellow dyeing of good fastness to wet processing is obtained.

Example 5

50.0 parts of 1-aminobenzene-4-(beta-hydroxyethylsulfone), 92.0 parts of sodium-1-amino-4-bromoanthraquinone-2-sulfonate of 88 percent strength, 50.4 parts of sodium bicarbonate, 260.0 parts of water and 8.0 parts of cuprous chloride are stirred at 65° C.–70° C. for about 20 hours. After cooling the dyestuff is filtered off with suction and washed with a concentrated sodium chloride solution. The moist press cake is heated to 90° C., while stirring, in 1600.0 parts of water, and 200.0 parts of $FeSO_4.7H_2O$. To this mixture 260.0 parts of an ammonium hydroxide solution of 28 percent strength are added within ½ hour and the whole is stirred for 1 hour. Thereupon, 1000.0 parts of hydrochloric acid of 10 percent strength are added and the mixture is heated at the boil, filtered off with suction and washed with hot, dilute hydrochloric acid, until the filtrate is free from iron.

The 1-amino-4-(beta-hydroxyethylsulfonyl) - anilido-anthraquinone thus obtained in a good yield is introduced at room temperature into 250.0 parts of concentrated sulfuric acid and the whole is stirred until a test-sample is clearly soluble in water. At a temperature of 0–+5° C., the sulfuric acid solution is then run in a thin jet, while stirring, into a mixture of 1200.0 parts of ice, 570.0 parts of water and 870.0 parts of a sodium hydroxide solution of 23 percent strength. A small quantity of acetic acid is then added to the mixture until the reaction is feebly acid, the whole is heated to 70° C. and filtered off with suction. The dyestuff so obtained corresponds to the following formula

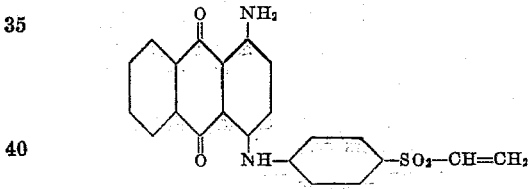

It dyes acetate rayon from a bath containing per litre 1 percent of di-sodium phosphate and 2 percent of the condensation product from 1 mol. of isooctylphenol and 9 mols. of ethylene oxide, violet tints of very good fastness to washing, fulling and sea-water and very good fastness to light.

Example 6

9.2 parts of 1-aminobenzene-4-vinylsulfone are diazotized in the usual manner and coupled in a dilute acid solution with 11.7 parts of 2.4-diaminobenzene-1-(beta-chlorethylsulfone). The dyestuff so obtained is converted with dilute alkali into the divinyl-compound which corresponds to the following formula

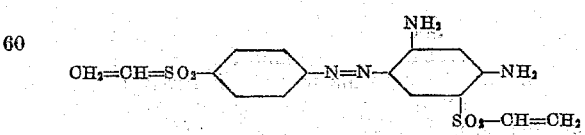

It dyes acetate rayon from a soap bath vivid redish-yellow tints of very good fastness to washing, perspiration, decatizing and fulling. On polyamide fibre there is obtained a vivid yellow of very good fastness to wet processing.

2.4-diaminobenzene - 1 - (beta-chlorethyl sulfone) can be prepared by reducing with iron and hydrochloric acid 2.4 - dinitro-benzene-1 - (beta-chlorethyl sulfone) melting at 112° C. which latter compound is obtainable by reacting chlorine or an agent yielding chlorine with 2.4 - dinitrobenzene-1-(beta-hydroxyethyl-sulfide) melting at 99° C.–100° C. in the presence of hydrochloric acid.

Example 7

66.5 parts of 1-chloro-2-nitrobenzene-4-(beta-hydroxyethylsulfone) are condensed with 26.8 parts of 1-amino-4-methyl-benzene in an aqueous alcoholic solution at the boil in the presence of sodium acetate. The beta-hydroxyethylsulfone compound obtained is introduced after being dried into sulfuric acid, the sulfuric acid solution is poured onto ice, the sulfuric acid ester is filtered off with suction and converted into the vinylsulfone-compound by the action of alkali. There is obtained the dyestuff of the following formula

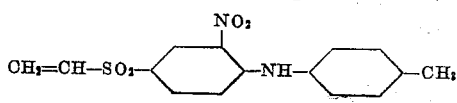

which dyes acetate rayon vivid yellow tints of good to very good fastness to washing, fulling and decatizing and very good to excellent fastness to light.

Example 8

13.5 parts of 1-amino-2.6-dichlorobenzene-4-(beta-hydroxyethylsulfone) are introduced into 60.0 parts of concentrated sulfuric acid, the whole is stirred for 3 hours at 35° C. and diazotized at 15°–20° C. with the calculated quantity of nitrosylsulfuric acid. The mixture is poured onto ice and coupled with 5.4 parts of 1-amino-3-methylbenzene. The dyestuff is filtered off with suction, freed from the main quantity of the acid by washing with water and converted by the action of a dilute alkali into the vinyl-compound of the following formula

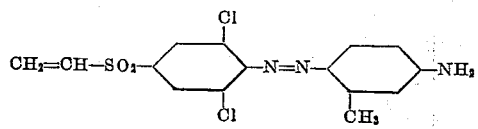

On acetate rayon there is obtained a reddish-yellow dyeing of a good to very good fastness to washing, fulling and light as well as a good to very good fastness to perspiration, sea-water and rubbing. Also on polyamide fibre there is obtained a reddish yellow of very good fastness to washing and fulling. The dyestuff can be diazotized on the fibre and coupled with various developers.

Example 9

16.0 parts of 4-amino-2-methyl-1.1'-azobenzene-4'-(beta-hydroxyethylsulfone) melting at 183° C., obtainable by coupling diazotized 1-aminobenzene-4-(beta-hydroxyethylsulfone) in an acid solution with 1-amino-3-methylbenzene, are made into a paste in the ball-mill with 70 parts by volume of 2 n-hydrochloric acid and 100 parts by volume of water and diazotized, while cooling, with 20 parts by volume of a 2.5 n-sodium nitrite solution. The clarified diazo-solution is slowly run into a solution of 5.4 parts of 1-hydroxy-2-methylbenzene and 25 parts by volume of a 2 n-sodium hydroxide solution, the medium being always weakly alkaline. When the coupling is complete the dyestuff is filtered off with suction. It melts at 203° C.–204° C. and is converted, after being dried, in the usual manner into the vinyl-compound by introducing it into concentrated sulfuric acid, stirring the sulfuric acid solution with ice and treating the sulfuric acid ester, which has been filtered off, with a dilute alkali. The dyestuff corresponds to the following formula

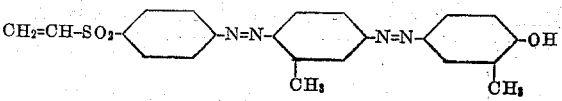

It dyes acetate rayon, from a bath containing per litre 1 percent. of disodium phosphate and 2 percent. of the condensation product from 1 mol. of isooctylphenol and 9 mols of ethylene oxide, reddish-yellow tints of good fastness to washing, fulling, perspiration and rubbing and very good fastness to light.

Example 10

13.5 parts of 1-amino-2.6-dichlorobenzene-4-(beta-hydroxyethylsulfone) are introduced into 60.0 parts of concentrated sulfuric acid and stirred for some time at 35° C. The sulfuric acid solution is then poured onto ice and diazotized with the calculated quantity of sodium nitrite. The diazo-solution is coupled with 14.5 parts of the compound of the following formula

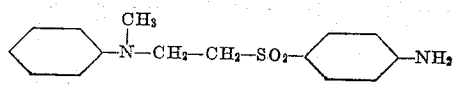

colorless crystals melting at 160° C., obtainable by condensing N-methylaniline with 1-aminobenzene-4-vinylsulfone, until the formation of the dyestuff is complete. The dyestuff is filtered off with suction and converted by the action of alkali into the vinyl-compound of the following formula

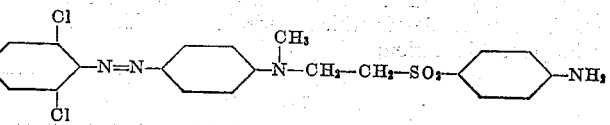

It dyes acetate rayon clear orange tints of very good fastness to washing, fulling, perspiration and sea-water and good fastness to light. Also on polyamide fibre there are obtained orange tints of very good fastness to wet processing and to light.

Example 11

14.0 parts of 1-amino-2-bromobenzene-4-(beta-hydroxyethylsulfone) are introduced into 50.0 parts of concentrated sulfuric acid and the whole is stirred for some time at 35° C. The sulfuric acid solution is poured onto ice and diazotized with the calculated quantity of sodium nitrite. The diazo-compound is then coupled with 11.2 parts of the compound of the following formula

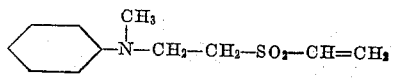

colorless oil boiling at 220–225° C. under 0.5 mm. pressure, which is obtained by reacting 1 mol. of N-methylaniline with 1 mol. of divinylsulfone. The dyestuff is then converted by the action of alkali into the divinylsulfone compound which corresponds to the following formula

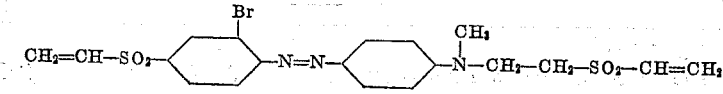

On acetate rayon a clear orange dyeing is obtained which can be discharged white and has good fastness to wet processing. Also on polyamide fibre there is obtained an orange dyeing of very good fastness to wet processing.

The following table indicates a number of further azo-dyestuffs which may be prepared according to the present invention and the tints obtained therewith on acetate rayon, which likewise possess good fastness properties:

| | Diazo component in the form of the sulfuric acid ester | Coupling component | Tint |
|---|---|---|---|
| (1) | 1-aminobenzene-4-vinylsulfone | 1-amino-3-methylbenzene | orange. |
| (2) | ......do...... | N-(3-methylbenzene)-tetrahydrothiazine dioxide of the formula<br><br>(structure: N-phenyl(3-methyl) substituted tetrahydrothiazine dioxide with CH₂—CH₂ / SO₂ / CH₂—CH₂ ring)<br><br>white needles melting at 94° C.–95.5° C. | reddish-yellow. |
| (3) | ......do...... | N-methyl-N-(beta-ethyl-vinylsulfone)-aniline. | orange. |
| (4) | 1-amino-2.6-dichlorobenzene-4-vinylsulfone. | 3.5-dimethyl-N.N-di-betahydroxy-ethylaniline. | brown-orange. |
| (5) | ......do...... | 3-methyl-6-methoxyaniline | orange. |
| (6) | ......do...... | 3-chloro-N.N-diethylaniline | Do. |
| (7) | 1-amino-2.6-dibromobenzene-4-vinylsulfone. | 3-chloro-6-methoxyaniline | Do. |
| (8) | 1-amino-2-chlorobenzene-4-vinylsulfone. | N.N-diethylaniline | scarlet. |
| (9) | 1-amino-2-bromobenzene-4-vinylsulfone. | 3.5-dimethyl-N.N-di-betahydroxy-ethylaniline. | red-brown. |
| (10) | ......do...... | 3-methyl-N-butyl-N-betahydroxy-ethylaniline. | scarlet-red. |
| (11) | ......do...... | 3-methyl-N.N-dimethylaniline | scarlet. |
| (12) | ......do...... | 3-chloro-N.N-diethylaniline | Do. |
| (13) | 1-amino-2.5-dichlorobenzene-4-vinylsulfone. | 3-methyl-N.N-di-betahydroxyethyl-aniline. | bluish red. |
| (14) | 1-amino-2-methyl-6-chloro-benzene-5-vinylsulfone. | 3-chloro-N.N-diethylaniline | yellow. |
| (15) | ......do...... | diphenylamine | Do. |
| (16) | 1-amino-2-nitrobenzene-4-vinylsulfone. | N.N-diethylaniline | red. |
| (17) | ......do...... | meta-amino-acetanilide | reddish-orange. |
| (18) | 1-aminobenzene-2-ethylsulfone-5-vinylsulfone. | 3-methyl-N.N-di-beta-hydroxyethyl-aniline. | pink. |
| (19) | 4-amino-2-methyl-1,1'-azobenzene-4'-vinylsulfone. | 1-amino-3-methylbenzene | brown-orange. |

The following table indicates further examples of dyestuffs from other classes which come into consideration for the present invention:

| Constitution | Tint |
|---|---|
| biphenyl—NH—C₆H₃(NO₂)—SO₂—CH=CH₂ | yellow. |
| phenyl(C₂H₅)N—C₆H₃(NO₂)—SO₂—CH=CH₂ | Do. |
| NH₂—C₆H₄—NH—C₆H₃(NO₂)—SO₂—CH=CH₂ | reddish-yellow. |
| H—C₆H₄—NH—C₆H₃(NO₂)—SO₂—CH=CH₂ | greenish-yellow. |
| 1-methylamino-4-(β-phenylsulfonylethylamino)-anthraquinone (O=C, NH—CH₃ / NH—CH₂—CH₂—C₆H₄—SO₂—CH=CH₂) | blue. |

We claim:
The water-insoluble dyestuff corresponding to the following formula

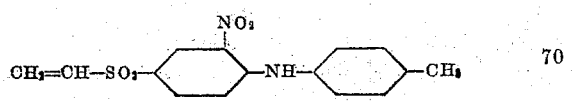

References Cited in the file of this patent

UNITED STATES PATENTS

| | | |
|---|---|---|
| 2,424,493 | Muller et al. | July 22, 1947 |
| 2,657,205 | Heyna et al. | Oct. 27, 1953 |
| 2,666,788 | Ebel | Jan. 19, 1954 |

FOREIGN PATENTS

| | | |
|---|---|---|
| 454,675 | Great Britain | 1936 |
| 497,065 | Belgium | Nov. 16, 1950 |
| 635,396 | Germany | May 20, 1934 |